United States Patent
Kinnard et al.

(10) Patent No.: US 9,941,704 B2
(45) Date of Patent: *Apr. 10, 2018

(54) AUTONOMOUS POWER SYSTEM WITH VARIABLE SOURCES AND LOADS AND ASSOCIATED METHODS

(71) Applicant: Oracle International Corporation, Redwood City, CA (US)

(72) Inventors: J. Rothe Kinnard, Austin, TX (US); Robert Cyphers, Fremont, CA (US); Brian Benstead, Farnham (GB)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/057,494

(22) Filed: Mar. 1, 2016

(65) Prior Publication Data
US 2016/0181816 A1  Jun. 23, 2016

Related U.S. Application Data

(63) Continuation of application No. 13/540,810, filed on Jul. 3, 2012, now Pat. No. 9,312,694.

(51) Int. Cl.
*H02J 1/10* (2006.01)
*H02J 3/00* (2006.01)
*H02J 3/14* (2006.01)
*H02M 1/10* (2006.01)
(Continued)

(52) U.S. Cl.
CPC ............... *H02J 4/00* (2013.01); *G06F 1/263* (2013.01); *G06F 1/28* (2013.01); *H02J 1/102* (2013.01); *H02J 9/00* (2013.01); *Y10T 307/391* (2015.04)

(58) Field of Classification Search
CPC ........ H02J 9/00; H02J 7/00; H02J 3/00; H02J 3/14; H02J 3/12; H02J 1/00; H02J 9/02;
(Continued)

(56) References Cited

U.S. PATENT DOCUMENTS 5,534,801 A * 7/1996 Wu ..................... G06F 13/4072
326/81
6,504,266 B1 * 1/2003 Ervin ..................... G06F 1/263
307/126

(Continued)

OTHER PUBLICATIONS

U.S. Appl. No. 13/540,810, Final Office Action dated Aug. 12, 2015, 16 pages.

(Continued)

*Primary Examiner* — Rexford Barnie
*Assistant Examiner* — Jagdeep Dhillon
(74) *Attorney, Agent, or Firm* — Kilpatrick Townsend & Stockton LLP

(57) ABSTRACT

A number of load units are connected to receive power from a number of power supply units. A potential load bus is connected to have a voltage level representative of both a total potential power requirement of the number of load units and a total potential power supply capability of the number of power supply units. A first control circuit enables operation of the number of load units when the voltage level on the potential load bus indicates that a sufficient supply of power is available. An actual load bus is connected to have a voltage level representative of both an actual total power consumption of the number of load units and an actual total power supply available from of the number of power supply units. A second control circuit signals an impending loss of sufficient power supply based on the monitored voltage level on the actual load bus.

20 Claims, 10 Drawing Sheets

(51) Int. Cl.
  *H02J 4/00*  (2006.01)
  *H02J 9/00*  (2006.01)
  *G06F 1/26*  (2006.01)
  *G06F 1/28*  (2006.01)

(58) Field of Classification Search
  CPC .......... H03K 5/00; H03K 5/153; G08B 21/00; H02M 1/00; G06F 1/26; G06F 1/28
  USPC ............ 307/29, 66, 64, 126, 82; 327/72, 77, 327/545, 530; 700/286, 287; 340/657, 340/655, 659
  See application file for complete search history.

(56) References Cited

U.S. PATENT DOCUMENTS

| | | | |
|---|---|---|---|
| 9,312,694 B2* | 4/2016 | Kinnard | .................. G06F 1/263 |
| 2006/0066112 A1 | 3/2006 | Geis et al. | |
| 2006/0226706 A1* | 10/2006 | Edelen | ...................... H02J 9/06 307/64 |
| 2011/0320796 A1* | 12/2011 | DeCusatis | ............... G06F 1/206 713/2 |
| 2012/0068541 A1* | 3/2012 | Anderson | ............... H02J 9/061 307/66 |
| 2013/0257623 A1* | 10/2013 | Bagasra | ............... G08B 27/005 340/657 |
| 2014/0008979 A1 | 1/2014 | Kinnard et al. | |

OTHER PUBLICATIONS

U.S. Appl. No. 13/540,810, Non-Final Office Action dated Feb. 23, 2015, 13 pages.
U.S. Appl. No. 13/540,810, Notice of Allowance dated Dec. 11, 2015, 11 pages.

* cited by examiner

AUTONOMOUS POWER SYSTEM WITH VARIABLE SOURCES AND LOADS AND ASSOCIATED METHODS

CLAIM OF PRIORITY

This application is a continuation application under 35 U.S.C. 120 of prior U.S. patent application Ser. No. 13/540,810, filed on Jul. 3, 2012. The disclosure of the above-identified patent application is incorporated herein by reference in its entirety for all purposes.

BACKGROUND

Units of computing systems and other electronic products are often mounted in rack enclosures to achieve a dense vertical stacking. The racks are often standardized at 19 inches or 23 inches of front panel width, have standard mounting hole positions, and provide areas for connecting interface cables and power to the units in the rack. The units may be interconnected to work together or may be independent and only in the same rack because of available space and power connections.

Input power for units in a rack may be standard AC (alternating current) power but may also be from one or more power converting units that provide power for some or all of the units in the rack, i.e., load units. The power converting units often provide functions such as redundant inputs and provide a DC (direct current) output. Providing isolation from primary input power, input redundancy, and power conversion to a regulated DC voltage in a separate power unit allows the other load units in the rack to be smaller and more efficient since they do not need their own power supplies to perform those functions. When a power converting unit is incorporated in a rack or otherwise used to provide power for a group of load units, there is a need for communication between the load units and the power converting unit to ensure reliable operation of the load units. It is within this context that the present invention arises.

SUMMARY

In one embodiment, a power system is disclosed. The power system includes a number of power supply units, and a number of load units connected to receive power from the number of power supply units. The power system includes a potential load bus connected to have a voltage level representative of both a total potential power requirement of the number of load units and a total potential power supply capability of the number of power supply units. The power system also includes a first control circuit connected to the potential load bus and defined to monitor the voltage level on the potential load bus and enable operation of one or more of the number of load units when the voltage level on the potential load bus indicates that a sufficient supply of power is available from the number of power supply units for operation of the one or more of the number of load units. The power system also includes an actual load bus connected to have a voltage level representative of both an actual total power consumption of the number of load units and an actual total power supply available from of the number of power supply units. The power system further includes a second control circuit connected to the actual load bus and defined to monitor the voltage level on the actual load bus and based on the monitored voltage level on the actual load bus signal an impending loss of the sufficient supply of power from the number of power supply units for operation of the one or more of the number of load units.

In one embodiment, a method is disclosed for operating a power system. The method includes applying a separate electrical current to a potential load bus for each of a number of operating power supply units. Each separate electrical current applied to the potential load bus is scaled in magnitude relative to a power supply capability of a given power supply unit to which the separate electrical current corresponds. The method also includes connecting a separate resistor between the potential load bus and a reference ground potential for each of a number of load units that are to receive power from the number of operating power supply units. Each separate resistor connected to the potential load bus has an electrical resistance scaled in magnitude relative to a power consumption of a given load unit to which the separate resistor corresponds. The method also includes comparing a voltage level on the potential load bus to a threshold voltage level to determine whether or not a sufficient supply of power is available from the number of operating power supply units for operation of the number of load units.

In one embodiment, a method is disclosed for configuring a power system. The method includes installing a number of power supply units and installing a number of load units. The method also includes connecting the number of load units to receive power from the number of power supply units. The method also includes connecting a separate first electric current source to supply electrical current to a potential load bus for each of the number of power supply units. Each first electrical current source is defined to supply an amount of electrical current based on a power output rating of a given one of the number of power supply units to which it corresponds. The method also includes connecting a separate first resistor to the potential load bus for each of the number of load units. Each first resistor is defined to provide an amount of electrical resistance based on a power consumption of a given one of the number of load units to which it corresponds. The method further includes connecting a separate first voltage comparator device to the potential load bus for each of the number of load units. Each first voltage comparator device has a first input connected to the potential load bus and a second input connected to a reference voltage supply to be set at a threshold voltage level and an output connected to a power control circuit of a given one of the number of load units to which it corresponds.

Other aspects of the invention will become more apparent from the following detailed description, taken in conjunction with the accompanying drawings, illustrating by way of example the present invention.

DETAILED DESCRIPTION

It should be appreciated that the present invention can be implemented in numerous ways, including as a process, an apparatus, a system, a device, or a method. Several exemplary embodiments of the invention will now be described in detail with reference to the accompanying drawings. In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
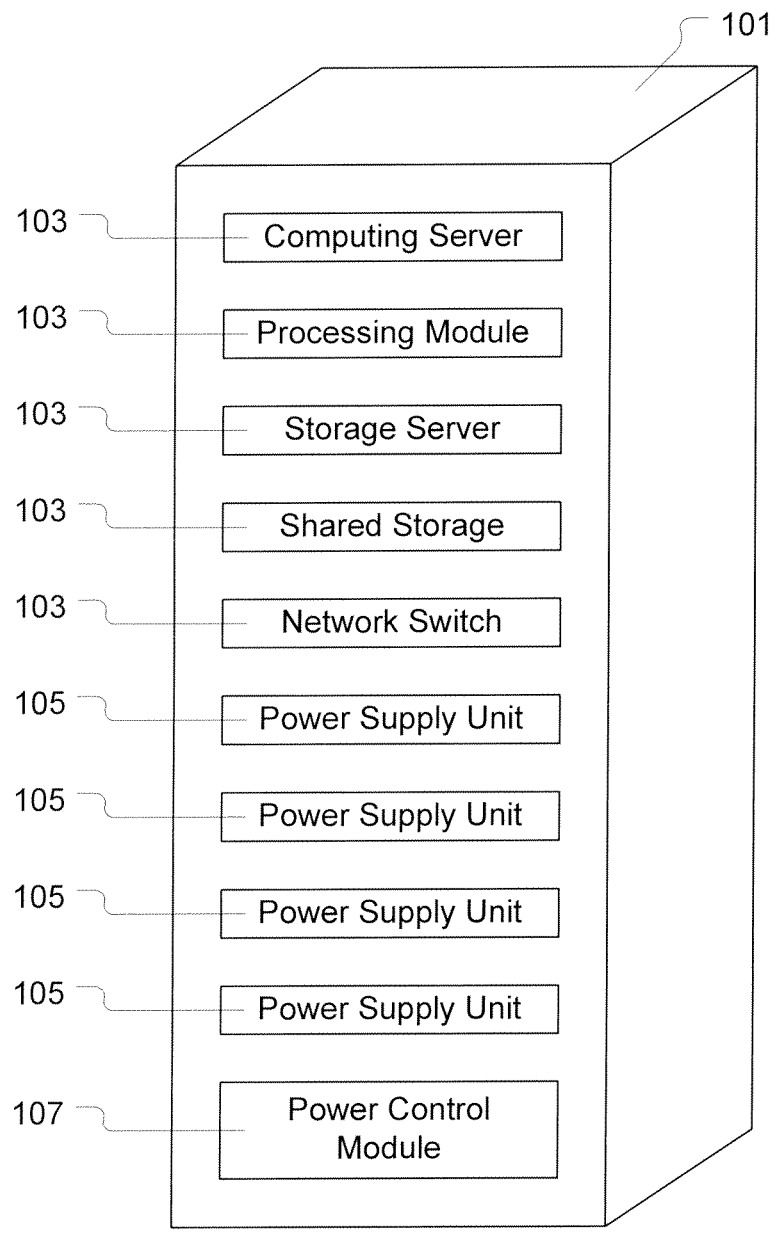
FIG. 1 shows a computing system that includes a number of power supply units and a number of load units, i.e., computing units or data management/transmission devices, in accordance with one embodiment of the present invention.

FIG. 1 shows a computing system 101 that includes a number of power supply units 105 and a number of load units 103, i.e., computing units or data management/transmission devices, in accordance with one embodiment of the present invention. It should be understood that the load units 103 can be any type of computing device or system component that receives power from the power supply units 105. For example, a given load unit 103 may be a computing server module, a processor module, a storage server module, a shared storage module, a network switch, or any other type of computing/data management device. Also, a given power supply unit 105 can be any type of power supply unit defined to supply electrical power to a power bus that services the load units 103 within the computing system 101. In one embodiment, the power supply units 105 receive alternating current electrical power from an electrical service supply line, convert the received alternating current electrical power into direct current power of specified voltage and amperage, and supply the direct current power to the power bus of the computing system 101.

In various embodiments of the computing system 101, the power supply units 105 and the load units 103 may or may not have a means of communicating with each other. For example, in one embodiment, the computing system 101 is a "dumb" system in which its power supply units 105 automatically turn on and attempt to provide power to its load units 103, without knowing what the total required load power is for the installed/operating load units 103. In this embodiment, if the required load power of the operating load units 103 exceeds the power supply capacity of the power supply units 105, the power supply units 105 may suffer an overload and be forced to shut off the power supply to the load units 103. Also, in the "dumb" system embodiment, when operation is achieved, the load units 103 will not be able to receive information about the status of the power supply units 105 and may suffer a sudden and unexpected loss of power in the event of power supply unit 105 failure. It should be appreciated that if the supply of power to a load unit 103 is shut off, the load unit 103 may suffer unrecoverable data loss and corruption of essential data in memory. Also, in the "dumb" system embodiment, adding a load unit 103 to the computing system 101 that is already in operation may result in an overload of the power supply units 105 and corresponding unexpected loss of power to all load units 103. The "dumb" system may not be desirable for computing equipment due to the lack of power failure warning. Most computing equipment requires some amount of warning prior to loss of power to prevent data corruption and/or hardware damage.

In another embodiment, the computing system 101 is a "normal" system in which the power supply units 105 are defined to provide status signals to the load units 103, such as a high temperature warning signal or input power loss warning signal, among others, to allow the load units 103 to prepare for a loss of power event. However, like the "dumb" system, the "normal" system is defined such that its power supply units 105 automatically turn on and attempt to provide power to its load units 103, without knowing what the total required load power is for the installed/operating load units 103. Thus, the "normal" system may also suffer from initial overloads or power failure when more load units 103 are added. The "normal" system is useful for fixed computing system configurations in which new load units 103 will not be added. In a fixed computing system configuration, the power supply units 105 are designed to have more power output capacity that the total power required by the load units 103. Also, in the "normal" system, the power supply units 105 warn the load units 103 of an impending power failure.

In another embodiment, the computing system 101 is a "smart" system in which a separate power controller module 107 is connected to manage the supply of power from the power supply units 105 to the load units 103. In one embodiment, the controller becomes active from standby or from the supply of main output power and directs the turn on of the load units 103 in the computing system 101. The power controller module 107 communicates with the power supply units 105 to know their output power capability. The power controller module 107 also communicates with the load units 103 to know how much power each load unit 103 requires. The power controller module 107 can then determine which of the load units 103 may be allowed to operate and prohibit operation of any load unit 103 that would cause an overload condition in which the total power consumption of the operating load units 103 exceeds the total power supply capability of the power supply units 105.

Also, the power controller module 107 operates to ensure that operation of any load unit 103 that is added to the computing system 101 is contingent upon a comparison of the newly added load unit's 103 power needs to the available power capacity of the power supply units 105. Similar to the "normal" system, the power supply units 105 of the "smart" system are defined to provide warning signals to the load units 103 of impending power failure, since the delay of transmitting warning signals through the power controller module 107 would not allow the load units 103 enough time to prepare for the imminent loss of power event.

The "smart" system is useful in highly configurable computing systems. The "smart" system may provide for variability in both the output power capability and the number of power supply units 105 that can be installed. The "smart" system can also be used with a wide selection of load units 103, including compute nodes, data storage units, and/or units to provide connectivity for transferring data in and out of the computing system, among others. An example of a "smart" system in the Chassis Management Module in the Sun Blade 6000, which is an intelligent power controller module 107 defined to gather data from all system components and manage the power supply units 105 and load units 103 such that there is minimal chance of an overload causing the power supply units 105 to fail.

It should be appreciated that the separate power control module 107 required of the "smart" system adds expense to the overall computing system. To avoid the added expense and complexity of the power control module 107, it is desirable to have a power system that provides the initial startup and overload protections of the "smart" system with the simple and less expensive configuration of the "normal" system. It is to this end that the present invention is provided. Specifically, the present invention provides a power system and associated methods of operation and configuration in which necessary information is provided between the power supply units 105 and load units 103 to achieve the initial startup and overload protections afforded by the "smart" system without the expense and complexity of the separate power control module 107 that is required in the "smart" system.

Figure 2A:
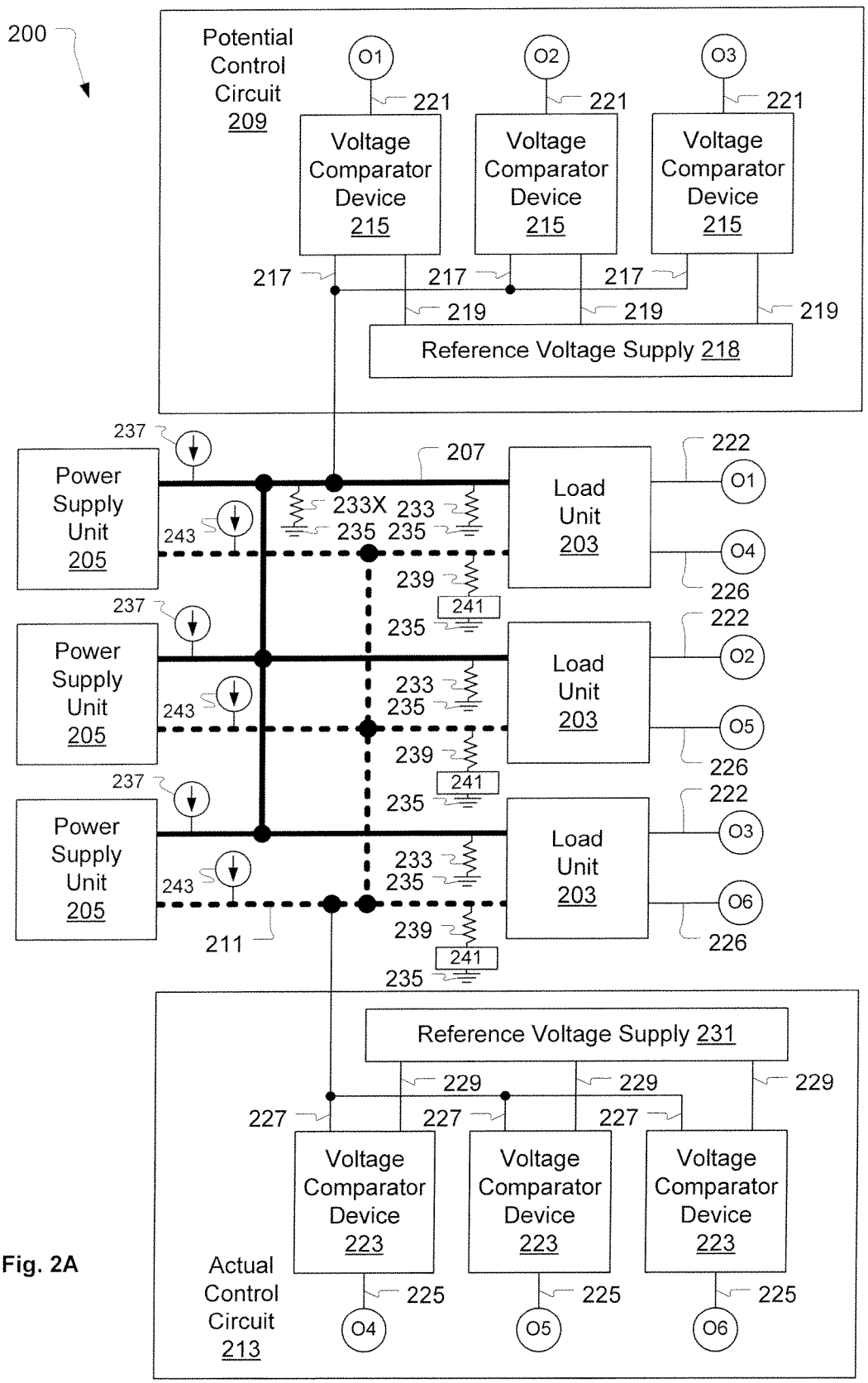
FIG. 2A shows a power system, in accordance with one embodiment of the present invention.

FIG. 2A shows a power system 200, in accordance with one embodiment of the present invention. The power system 200 includes a number of power supply units 205. The power supply system 200 also includes a number of load units 203 connected to receive power from the number of power supply units 205. The power system 200 also includes a potential load bus 207 connected to have a voltage level representative of both a total potential power requirement of the number of load units 203 and a total potential power supply capability of the number of power supply units 205. The power system 200 further includes a first control circuit 209 connected to the potential load bus 207. The first control circuit 209 is also referred to as the Potential Control Circuit 209. The first control circuit 209 is defined to monitor the voltage level on the potential load bus 207 and enable operation of one or more of the number of load units 203 when the voltage level on the potential load bus 207 indicates that a sufficient supply of power is available from the number of power supply units 205 for operation of the one or more of the number of load units 203.

The power system 200 also includes an actual load bus 211 connected to have a voltage level representative of both an actual total power consumption of the number of load units 203 and an actual total power supply available from of the number of power supply units 205. The power system 200 further includes a second control circuit 213 connected to the actual load bus 211. The second control circuit 213 is also referred to as the Actual Control Circuit 213. The second control circuit 213 is defined to monitor the voltage level on the actual load bus 211, and based on the monitored voltage level on the actual load bus 211 signal an impending loss of the sufficient supply of power from the number of power supply units 205 for operation of the one or more of the number of load units 203.

The first control circuit 209 is defined to compare the voltage level of the potential load bus 207 to a threshold voltage level to determine whether or not each of the number of load units 203 is to be enabled for operation. In one embodiment, the first control circuit 209 is defined to enable the number of load units 203 for operation on an individual load unit 203 basis when the voltage level of the potential load bus 207 is greater than the threshold voltage level. In one embodiment, the first control circuit 209 includes separate voltage comparator devices 215 respectively connected to the number of load units 203. Each of the separate voltage comparator devices 215 has a first input 217 connected to the potential load bus 207 and a second input 219 connected to a reference voltage supply 218 to be set at the threshold voltage level, and an output 221 connected to a power control circuit input 222 of the load unit 203 to which the voltage comparator device 215 is connected.

The second control circuit 213 is defined to compare the voltage level of the actual load bus 211 to a threshold voltage level to determine whether or not an actual total supply of power from the number of power supply units 205 is sufficient to support continued operation of the number of load units 203 that are in an operating state. In one embodiment, the second control circuit 213 is defined to transmit a power fault warning signal when the voltage level of the actual load bus 211 is less than the threshold voltage level. In one embodiment, the power fault warning signal is transmitted instantaneously and continuously from the second control circuit 213 to each of the number of load units 203 when the voltage level of the actual load bus 211 is less than the threshold voltage level. In one embodiment, the second control circuit 213 includes separate voltage comparator devices 223 respectively connected to the number of load units 203. Each of the separate voltage comparator devices 223 has an output 225 connected to a power control circuit input 226 of the load unit 203 to which the voltage comparator device 223 is connected. Each of the separate voltage comparator devices 223 has a first input 227 connected to the actual load bus 211, and a second input 229 connected to a reference voltage supply 231 to be set at the threshold voltage level.

The power system 200 also includes a first number of resistors 233 connected between the potential load bus 207 and a reference ground potential 235. The first number of resistors 233 respectively correspond to the number of load units 203. Each of the first number of resistors 233 has an amount of electrical resistance based on a power consumption of the load unit 203 to which it corresponds. In one embodiment, the first number of resistors 233 includes at least one resistor 233X that does not correspond to one of the number of load units 203. The at least one resistor 233X has an amount of electrical resistance based on a prescribed amount of power supply margin.

The power system 200 also includes a first number of current sources 237 connected to supply electrical current to the potential load bus 207. The first number of current sources 237 respectively correspond to the number of power supply units 205. Each of the first number of current sources 237 is defined to supply an amount of electrical current based on a power output rating of the power supply unit 205 to which it corresponds.

The power system 200 also includes a second number of resistors 239 connected between the actual load bus 211 and the reference ground potential 235 through a corresponding controllable connection device 241 defined to connect its resistor 239 to the reference ground potential 235 when its corresponding load unit 203 is an operating state. In one embodiment, the controllable connection device 241 is defined as a transistor, such as an NMOS or PMOS transistor. However, it should be understood that in other embodiments, the controllable connection device 241 can be defined as essentially any type of electrical device that performs an electrical switching function in response to a control signal. The second number of resistors 239 respectively correspond to the number of load units 203. Each of the second number of resistors 239 has an amount of electrical resistance based on power consumption of the load unit 203 to which it corresponds, such that for a given one of the number of load units 203 the amount of electrical resistance of each of the corresponding one of the second number of resistors 239 and the corresponding one of the first number of resistors 233 is substantially equal.

The power system 200 also includes a second number of current sources 243 connected to supply electrical current to the actual load bus 211. The second number of current sources 243 respectively correspond to the number of power supply units 205. Each of the second number of current sources 243 is defined to supply an amount of electrical current based on a power output rating of the power supply unit 205 to which it corresponds, such that for a given one of the number of power supply units 205 the amount of electrical current to be supplied by each of the corresponding one of the second number of current sources 243 and the corresponding one of the first number current sources 237 is substantially equal. In one embodiment, each of the number of power supply units 205 is defined to control activation of its corresponding one of the first number of current sources 237 and its corresponding one of the second number of current sources 243.

Figure 2B:
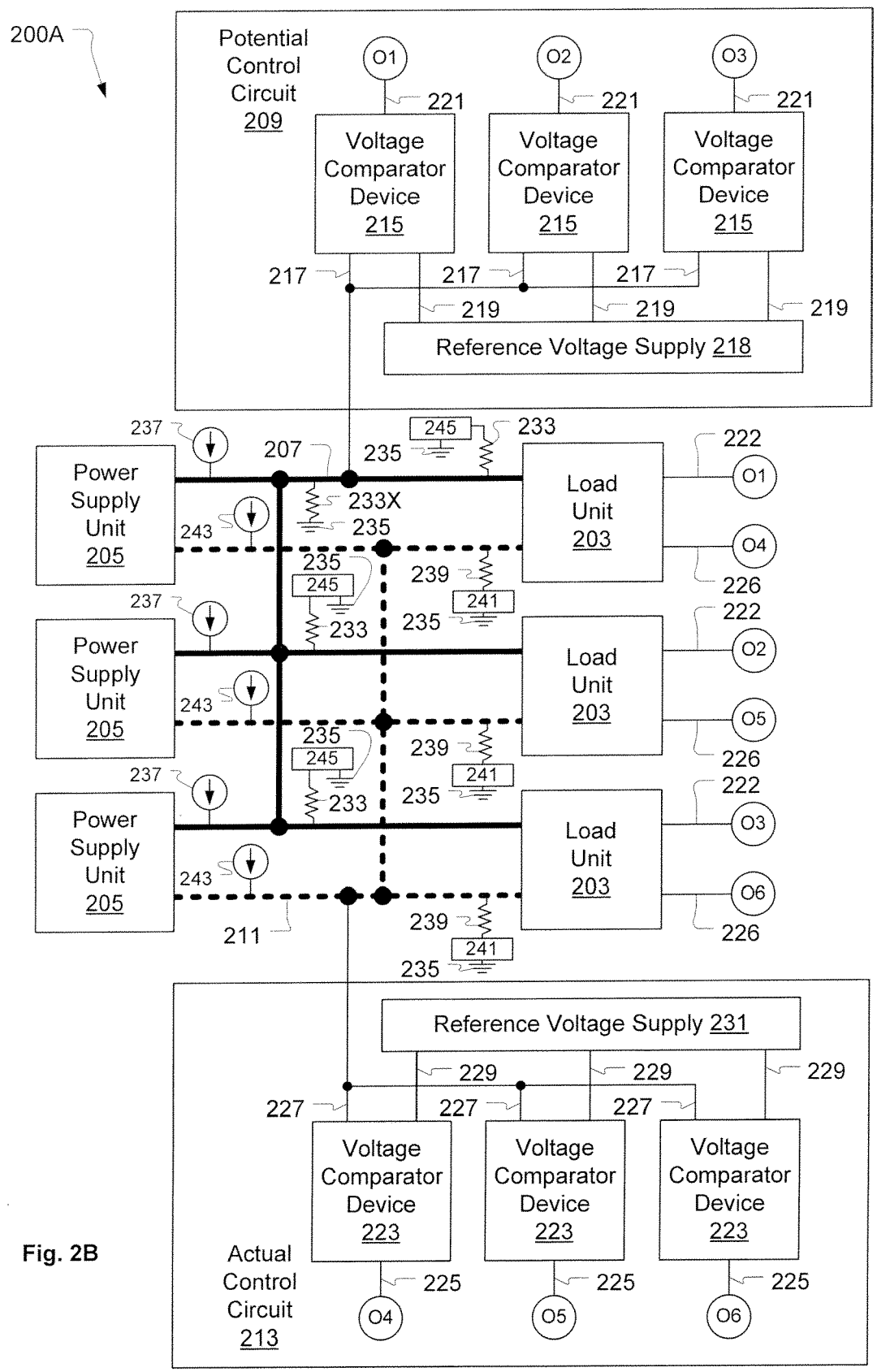
FIG. 2B shows a power system that is a variation of the power system of FIG. 2A, in accordance with one embodiment of the present invention.

FIG. 2B shows a power system 200A that is a variation of the power system 200 of FIG. 2A, in accordance with one embodiment of the present invention. The power system 200A includes each feature previously identified with regard to the power system 200 of FIG. 2A. The power system 200A differs from the power system 200 in that each of the first number of resistors 233 is connected to the reference ground potential 235 by way of a corresponding controllable connection device 245. The controllable connection devices 245 respectively connected to the first number of resistors 233 to provide individual control of an electrical connection between the first number of resistors 233 and the reference ground potential 235, such that a given one of the first number of resistors 233 is connected to the reference ground potential 235 when the load unit 203 corresponding to the given one of the first number of resistors 233 issues a request to receive power.

Figure 2C:
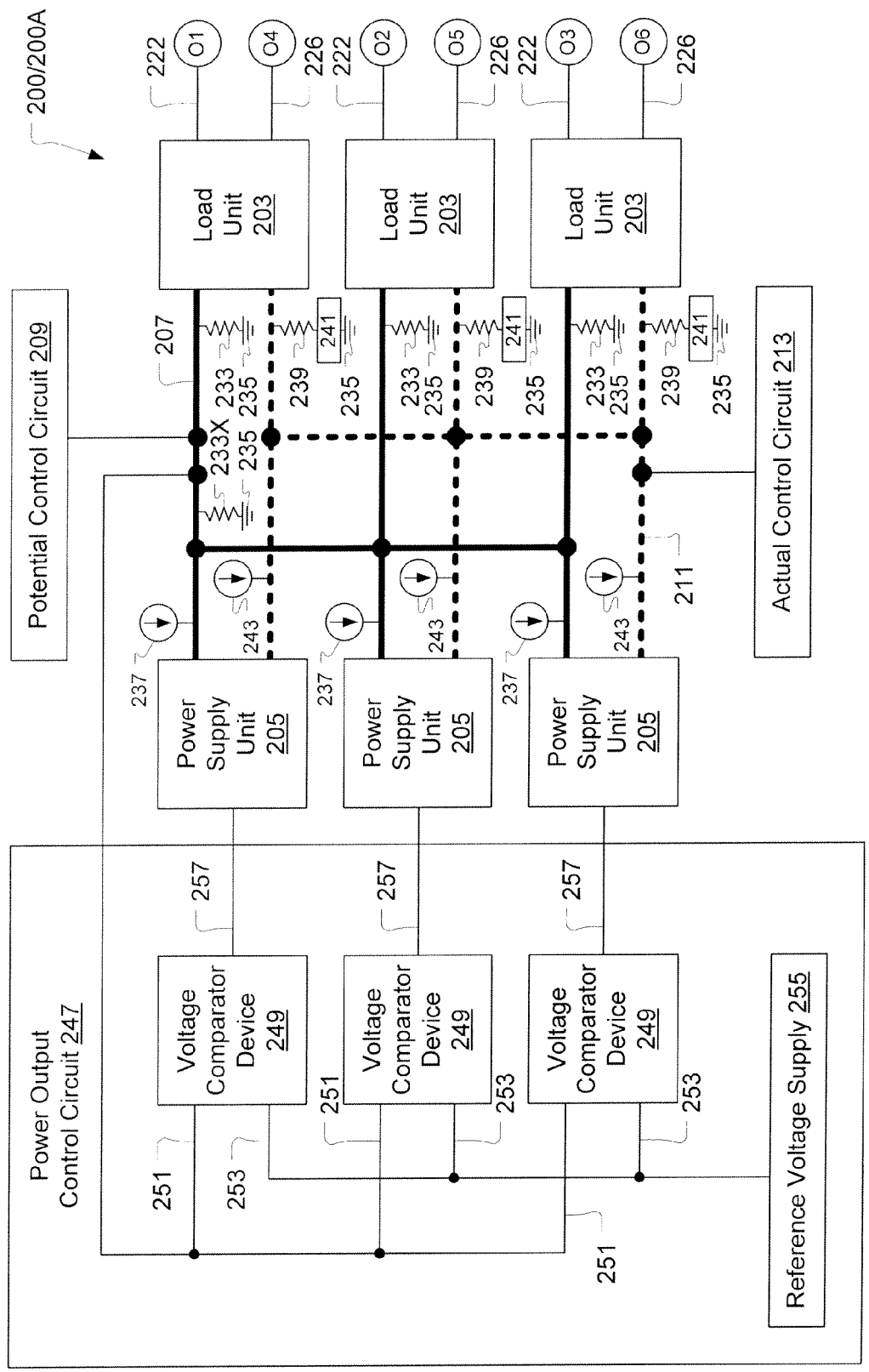
FIG. 2C shows the power systems in which a third control circuit is provided to control release of output power from the power supply units to the power bus that services the load units, in accordance with one embodiment of the present invention.

FIG. 2C shows the power system 200 in which a third control circuit 247 is provided to control release of output power from the power supply units 205 to the power bus that services the load units 203, in accordance with one embodiment of the present invention. The third control circuit 247 is also referred to as a power output control circuit 247. It should be understood that the potential control circuit 209 and actual control circuit 213 as shown in FIG. 2C includes the components are corresponding connections as previously described with regard to FIG. 2A. Also, it should be understood that the third control circuit 247 can be implemented with the power system 200A of FIG. 2B in an equivalent manner as shown in FIG. 2C with regard to the power system 200.

In one embodiment, the third control circuit 247 is defined to disable output of power from the number of power supply units 205 to the number of load units 203 until an actual total available supply of power from the number of power supply units 205 is sufficient to support operation of the number of load units 203 that are requesting power. In this embodiment, the third control circuit 247 is defined to enable output of power from the number of power supply units 205 to the number of load units 203 when the actual total available supply of power from the number of power supply units 205 is sufficient to support operation of the number of load units 203.

In one embodiment, the third control circuit 247 is defined to compare the voltage level of the potential load bus 207 to a threshold voltage level to determine whether or not output of power from the number of power supply units 205 is to be enabled or disabled. For instance, in one embodiment, the third control circuit 247 is defined to enable output of power from the number of power supply units 205 to the number of load units 203 when the voltage level of the potential load bus 207 is greater than the threshold voltage level, and disable output of power from the number of power supply units 205 to the number of load units 203 when the voltage level of the potential load bus 207 is less than the threshold voltage level.

In the example embodiment of FIG. 2C, the third control circuit 247 includes separate voltage comparator devices 249 respectively connected to the number of power supply units 205. Each of the separate voltage comparator devices 249 has a first input 251 connected to the potential load bus 207, and a second input 253 connected to a reference voltage supply 255 to be set at the threshold voltage level. Each of the separate voltage comparator devices 249 has an output 257 connected to a power output control of the power supply unit 205 to which the voltage comparator device 249 is connected.

Unlike the above-mentioned "normal" power system, the power system 200/200A of the present invention provides the potential load bus 207, whose voltage level can be monitored in real-time to provide power overload warning/protection during initial startup and during operation when a new load unit 203 is added. Also, unlike the above-mentioned "normal" power system, the power system 200/200A of the present invention provides the actual load bus 211, whose voltage level can be monitored in real-time during operation to provide power loss warning/protection in the event that one or more power supply units 205 go offline during operation. In addition, it should be appreciated that the power system 200/200A of the present invention does not require the separate power control module 107 of the above-mentioned "smart" power system and its associated expense and complexity. In other words, the power system 200/200A of the present invention functions autonomously in a manner that provides power overload warning/protection, but without the need for a separate power control module 107.

In one embodiment, the power supply units 205 are inhibited from supplying power to the main power bus until the total power capacity available equals or exceeds the total power needs of the load units 203. In one embodiment, new load units 203 that are added to an operating computing system will have their power requirements compared to the available power capacity to determine if they can be activated. It should be appreciated that in the power system 200/200A, impending power failure warnings from the power supply units 205 are incorporated into the two wire interface formed by the actual load bus 211 and potential load bus 207, such that transmission of additional signals between the power supply units 205 and load units 203 is not required.

The potential load bus 207 and actual load bus 211 provide a two wire interface that connects all power supply units 205 to all load units 203. In one embodiment, the two wire interface uses low voltage signals, e.g., less than 5

Volts, that are isolated from the primary power bus to which the power supply units 205 are connected to supply power. More specifically, a first low voltage signal is provided on the potential load bus 207, and a second low voltage signal is provided on the actual load bus 211. The potential load bus 207 is pulled toward a higher voltage level by the current sources 237. The potential load bus 207 is pulled toward a lower voltage level by the resistors 233. The actual load bus 211 is pulled toward a higher voltage level by the current sources 243. The actual load bus 211 is pulled toward a lower voltage level by the resistors 239.

All devices connected by the two bus wires, i.e., by the potential load bus 207 and by the actual load bus 211, have voltage threshold detectors to determine if each voltage on the potential load bus 207 and actual load bus 211 is above or below a certain reference voltage (or threshold voltage). Specifically, the voltage comparator devices 215 are connected to determine if the voltage on the potential load bus 207 is above or below the threshold voltage set by the reference voltage supply 218. And, the voltage comparator devices 223 are connected to determine if the voltage on the actual load bus 211 is above or below the threshold voltage set by the reference voltage supply 231. In one embodiment, the reference voltage supplies 218 and 231 are defined separate from each other. In another embodiment, the reference voltage supplies 218 and 231 correspond to a single, i.e., same, reference voltage supply.

The potential load bus 207 is used by the power supply units 205 when the computing system is starting from an off condition without input power for the power supply units 205 or when the computing system is restarting after a fault condition. There can be multiple power supply units 205 operating in parallel for a large power load and the power supply units 205 may or may not have equal output power capabilities. Each load unit 203 has its corresponding resistor 233 connected to the potential load bus 207. The resistor 233 corresponding to a given load unit 203 has an electrical resistance to the reference ground potential 235, e.g., system ground, that corresponds to the amount of electrical power that the given load unit 203 will need. As each power supply unit 205 receives input power and becomes ready to deliver power to the main power bus and ultimately to the load units 203, the power supply unit 205 directs connection of its corresponding current source 237 to the potential load bus 207. The current source 237 corresponding to a given power supply unit 205 provides an amount of electrical current to the potential load bus 207 based on the power output capacity of the given power supply unit 205. Each current source 237 increases the voltage on the potential load bus 207.

In one embodiment, the power supply units 205 do not begin delivering power to the main power bus unless the voltage on the potential load bus 207 has reached its prescribed threshold voltage level. The prescribed threshold voltage level of the potential load bus 207 that is required for the power supply units 205 to start delivering power to the main power bus is set such that the power supply units 205 will have sufficient total power output capacity to power all of the load units 203 that are connected in the computing system.

After the computing system is in operation, the potential load bus 207 functions to provide a real-time test of the ability of the total power output capacity of the power supply units 205 to support addition of a new load unit 203 in combination with the already operational load units 203. When a new load unit 203 is to be added to the computing system, a resistor 233 associated with the new load unit 203 is connected to the potential load bus 207. The resistor 233 associated with the new load unit 203 has an electrical resistance based on the new load unit's power requirement.

The voltage comparator device 215 corresponding to the new load unit 203 operates to determine if the voltage on the potential load bus 207, after connection of the new load unit's resistor 233, is still above the threshold voltage level indicative of having a sufficient supply of power from the power supply units 205. If the voltage on the potential load bus 207 remains above the threshold voltage level after connection of the new load unit's resistor 233, the new load unit 203 is allowed to turn on and receive power from the main power bus. However, if the voltage on the potential load bus 207 falls below the threshold voltage level after connection of the new load unit's resistor 233, the new load unit 203 is not allowed to turn on and receive power from the main power bus, thereby protecting the computing system from a potential power overload condition.

The current sources 243 that are connected to the actual load bus 211 serve to pull up the voltage on the actual load bus 211. The current sources 243 that are connected to the actual load bus 211 are similar to or identical to the current sources 237 that are connected to the potential load bus 207. As with the current sources 237, the current sources 243 can be defined within its corresponding power supply unit 205 or defined outside its corresponding power supply unit 205. The resistors 239 that are connected to the actual load bus 211 serve to pull down the voltage on the actual load bus 211. The resistors 239 that are connected to the actual load bus 211 are similar to or identical to the resistors 233 that are connected to the potential load bus 207. However, unlike the resistors 233 that are connected to the potential load bus 207, each resistor 239 that is connected to the actual load bus 211 is only connected to the reference ground potential 235, by way of its controllable connection device 241, when the load unit 203 associated with the resistor 239 is activated and receiving power from the main power bus of the computing system.

When a given load unit 203 has been allowed to turn on because the voltage level on the potential load bus 207 is greater than the required threshold voltage level, the controllable connection device 241 is operated to connect the resistor 239 corresponding to given load unit 203 to the reference ground potential 235, thereby lowering the voltage level on the actual load bus 211 to reflect the power consumption of the given load unit 203. In one embodiment, the controllable connection device 241 is defined as an electrical switching device, such as a MOSFET, connected between its corresponding resistor 239 and the reference ground potential 235. It should be appreciated that the voltage level on the actual load bus 211 represents a real-time comparison between the total power output capacity of the power supply units 205 and the total power requirements of the operating, i.e., active, load units 203.

With the computing system in operation and a number of load units 203 operating, the actual load bus 211 provides the function of warning the load units 203 of a power supply unit 205 shut down (deactivation or failure), by way a drop in voltage on the actual load bus 211 when the current source 243 corresponding to the shut down power supply unit 205 is immediately turned off in conjunction with the shut down of the power supply unit 205. For example, if a given power supply unit 205 needs to shut down for some reason, e.g., exceeding temperature limit, the given power supply unit 205 can turn off its corresponding current source 243 a short period of time before the given power supply unit 205 stops supplying power to the main power bus of the computing system. By way of example, the current source 243 can be turned off a few tens of milliseconds before its corresponding power supply unit 205 stops supplying power to the main power bus. Then, if the loss of the given power supply unit 205 will reduce the total available power on the main power bus to a level that the remaining operational power supply units 205 may overload or fail, the shut off of the current source 243 associated with the given power supply unit 205 will cause the voltage level on the actual load bus 211 to fall below the threshold voltage level that indicates sufficient power availability, thereby providing a warning to the load units 203 to prepare for a possible imminent loss of power event.

In addition to overheating and/or device failure, another cause for power loss is a failure of the input power source to one or more of the power supply units 205. It should be appreciated, however, that the loss-of-power warning provided through monitoring of the voltage level on the actual load bus 211 is not affected by the root cause of the power loss. Each power supply unit 205 can have some amount of energy storage capacity to provide residual power output to the main power source in the even that the power supply unit 205 shuts down. In one embodiment, the power supply unit 205 can provide up to 10 milliseconds or more of residual power output to the main power bus after shut down of the power supply unit 205. In one embodiment, once a given power supply unit 205 is turned on, the given power supply unit 205 may ignore the voltage levels present on the potential load bus 207 and actual load bus 211, and only turn off for an overload or other fault condition. Also, in one embodiment, when a fault condition causes a given power supply unit 205 to turn off, the given power supply unit 205 may remain inactive for a set delay time and then reactivate its current sources 237, 243 to begin a restart sequence.

Figure 3:
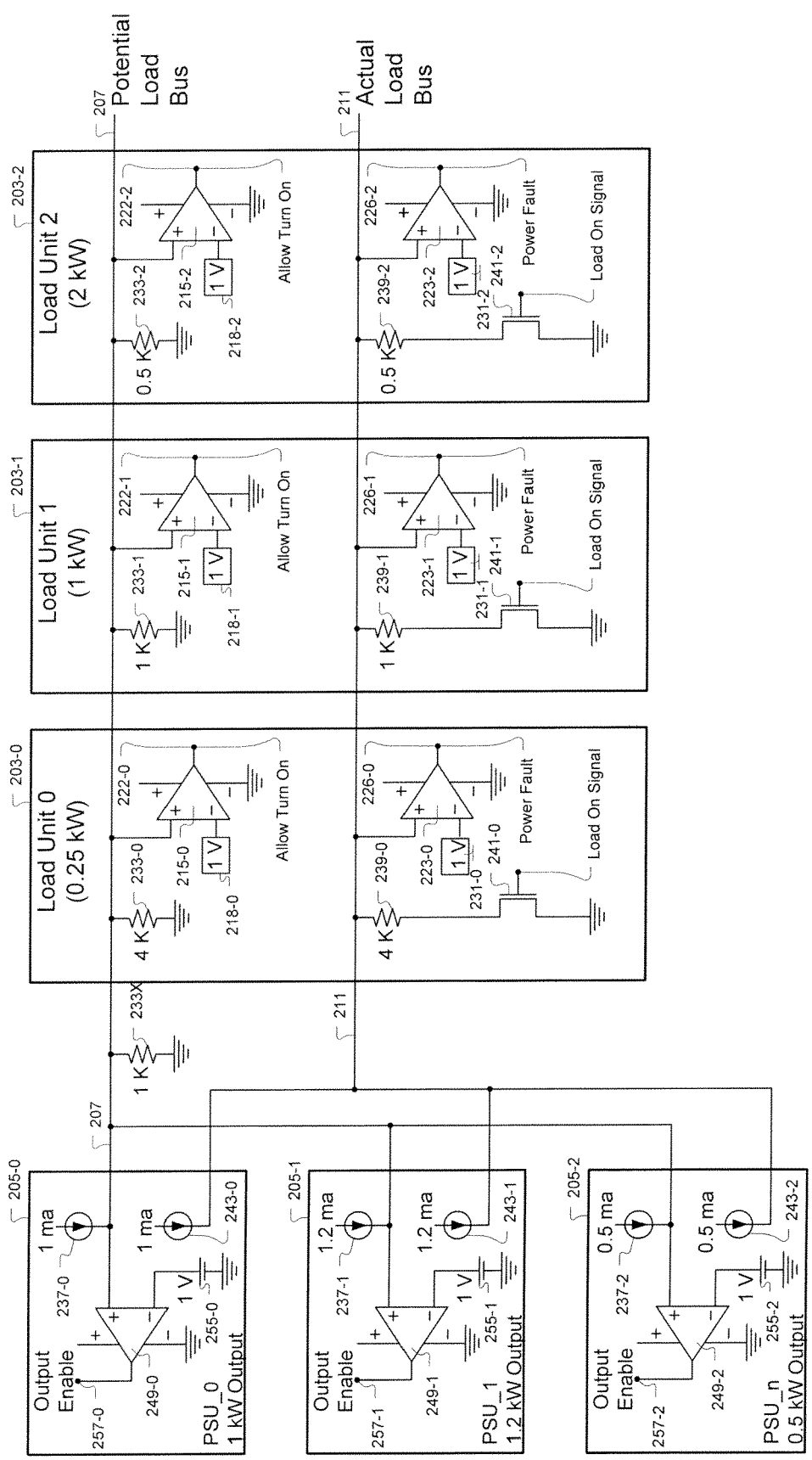
FIG. 3 shows a power system as an example implementation of the power system, in accordance with one embodiment of the present invention.

FIG. 3 shows a power system 300 as an example implementation of the power system 200, in accordance with one embodiment of the present invention. The power system 300 includes three power supply units 205-0, 205-1, 205-2, and three load units 203-0, 203-1, 203-2. It should be understood that the three power supply units 205-0, 205-1, 205-2 and the three load units 203-0, 203-1, 203-2 in the power system 300 are provided by way of example. In other embodiments, the power system 200/200A can include any number of power supply units 205 and any number of load units 203. In the example power system 300, the power supply units 205-0, 205-1, 205-2 include current sources 237-0, 237-1, 237-2, respectively, connected to the potential load bus 207, and current sources 243-0, 243-1, 243-2, respectively, connected to the actual load bus 211. Each of the current sources 237-0, 237-1, 237-2 turns on when its power supply unit 205-0, 205-1, 205-2 is ready to supply power to the main power bus. Each of the current sources 243-0, 243-1, 243-2 turns on when its power supply unit 205-0, 205-1, 205-2 is actively supplying power to the main power bus.

Also, in the example power system 300, the power supply units 205-0, 205-1, 205-2 include the voltage comparator devices 249-0, 249-1, 249-2, respectively, having a first input connected to the potential load bus 207. The voltage comparator devices 249-0, 249-1, 249-2 each have a second input connected to the reference voltage supplies 255-0, 255-1, 255-2, respectively. In the example power system 300, the reference voltage supplies 255-0, 255-1, 255-2 are each defined to supply a reference voltage of about 1 Volt to the second input of its respective one of the voltage comparator devices 249-0, 249-1, 249-2.

Each of the voltage comparator devices 249-0, 249-1, 249-2 has a respective output 257-0, 257-1, 257-2 connected to provide a corresponding output enable signal to the power supply unit 205-0, 205-1, 205-2 in which the voltage comparator device 249-0, 249-1, 249-2 is defined. The output enable signals provided by the voltage comparator devices 249-0, 249-1, 249-2 direct the corresponding power supply units 205-0, 205-1, 205-2 as to when they can release power to the main power bus. In the example power system 300, the output enable signals provided by the voltage comparator devices 249-0, 249-1, 249-2 will direct the corresponding power supply units 205-0, 205-1, 205-2 to release power to the main power bus when the voltage level on the potential load bus 207 is greater than the reference voltage of 1 Volt.

In the example power system 300, the load units 203-0, 203-1, 203-2 include resistors 233-0, 233-1, 233-2, respectively, connected to the potential load bus 207 and resistors 239-0, 239-1, 239-2, respectively, controllably connected to the actual load bus to 211. Controllable connection devices 241-0, 241-1, 241-2 are connected to control connection of the resistors 239-0, 239-1, 239-2 to the reference ground potential, such that the resistors 239-0, 239-1, 239-2 are connected to the reference ground potential when its corresponding load unit 203-0, 203-1, 203-2 is turned on and operating, and such that the resistors 239-0, 239-1, 239-2 are not connected to the reference ground potential when its corresponding load unit 203-0, 203-1, 203-2 is not turned on and operating.

Also, in the example power system 300, the load units 203-0, 203-1, 203-2 include the voltage comparator devices 215-0, 215-1, 215-2, respectively, having a first input connected to the potential load bus 207, and a second input connected to the reference voltage supplies 218-0, 218-1, 218-2, respectively. In the example power system 300, the reference voltage supplies 218-0, 218-1, 218-2 are each defined to supply a reference voltage of about 1 Volt to the second input of its respective one of the voltage comparator devices 215-0, 215-1, 215-2.

Each of the voltage comparator devices 215-0, 215-1, 215-2 has a respective output 222-0, 222-1, 222-2 connected to provide a corresponding power on control signal to the load unit 203-0, 203-1, 203-2 in which the voltage comparator device 215-0, 215-1, 215-2 is defined. In the example power system 300, the power on control signals provided by the voltage comparator devices 215-0, 215-1, 215-2 will direct the corresponding load units 203-0, 203-1, 203-2 to turn on when the voltage level on the potential load bus 207 is greater than the reference voltage of 1 Volt.

In the example power system 300, the load units 203-0, 203-1, 203-2 also include the voltage comparator devices 223-0, 223-1, 223-2, respectively, having a first input connected to the actual load bus 211, and a second input connected to the reference voltage supplies 231-0, 231-1, 231-2, respectively. In the example power system 300, the reference voltage supplies 231-0, 231-1, 231-2 are each defined to supply a reference voltage of about 1 Volt to the second input of its respective one of the voltage comparator devices 223-0, 223-1, 223-2.

Each of the voltage comparator devices 223-0, 223-1, 223-2 has a respective output 226-0, 226-1, 226-2 connected to provide a corresponding power fault signal to the load unit 203-0, 203-1, 203-2 in which the voltage comparator device 223-0, 223-1, 223-2 is defined. In the example power system 300, the power fault signals provided by the voltage comparator devices 223-0, 223-1, 223-2 will provide an imminent loss of power warning to the corresponding load units 203-0, 203-1, 203-2 when the voltage level on the actual load bus 211 falls below the reference voltage of 1 Volt, thereby providing the load units 203-0, 203-1, 203-2 an amount of time to prepare for power loss on the main power bus. As previously mentioned, the power supply units 205-0, 205-1, 205-2 have an amount of residual, i.e., capacitive, power output capability upon shut down, which provides the amount of time for the load units 203-0, 203-1, 203-2 to prepare for power loss on the main power bus.

In the example power system 300, the power supply units 205-0, 205-1, 205-2 have power output capacities of 1 kilowatt (kW), 1.2 kW, and 0.5 kW, respectively. The current sources 237-0, 237-1, 237-2, 243-0, 243-1, 243-2 in the power supply units 205-0, 205-1, 205-2 are scaled to provide an output current of 1 milliamp (mA) per 1 kilowatt of power output capacity of its corresponding power supply unit 205-0, 205-1, 205-2. Thus, the current sources 237-0 and 243-0 each provide an output current of 1 mA. The current sources 237-1 and 243-1 each provide an output current of 1.2 mA. And, the current sources 237-2 and 243-2 each provide an output current of 0.5 mA.

The equivalent bus resistance for each load unit 203-0, 203-1, 203-2 is then set at (1000 Watts×1000 Ohms) divided by the power required for each load unit 203-0, 203-1, 203-2 in Watts. Therefore, the resistors 233-0 and 239-0 each have a resistance of about 4 kiloOhms (K) for the load unit 203-0. The resistors 233-1 and 239-1 each have a resistance of about 1 K for the load unit 203-1. And, the resistors 233-2 and 239-2 each have a resistance of about 0.5 K for the load unit 203-2. With these choices for the current sources 237-0, 237-1, 237-2, 243-0, 243-1, 243-2 and resistors 233-0, 233-1, 233-2, 239-0, 239-1, 239-2, the voltage on each of the potential load bus 207 and actual load bus 211 will be above 1 Volt if the total power output capacity of the power supply units 205-0, 205-1, 205-2 is greater than the total power required by the load units 203-0, 203-1, 203-2, and below 1 Volt otherwise. Therefore, the voltage threshold for the potential load bus 207 and the actual load bus 211 buses is set at about 1 Volt.

In the example power system 300, the power supply units 205-0, 205-1, 205-2 will be enabled when their total power output capacity exceeds 4.25 kW. The 4.25 kW threshold is set by the parallel combination of resistors 233-0, 233-1, 233-2, and 233X. A current of 4.25 mA or greater must be present from the power sources to raise the voltage on bus 207 to more than 1 Volt. Then, when the power supply units 205-0, 205-1, 205-2 are enabled and supplying power to the main power bus, all load units 203-0, 203-1, 203-2 will be allowed to turn on because the voltage on the potential load bus 207 will be greater than 1 Volt. As the load units 203-0, 203-1, 203-2 turn on, their corresponding resistors 239-0, 239-1, 239-2 will be connected between the actual load bus 211 and the reference ground potential by way of the corresponding controllable connection devices 241-0, 241-1, 241-2. Initially, the voltage on the actual load bus 211 will also be greater than 1 V, as the actual load bus 211 is initially a duplicate of the potential load bus 207 with regard to its electrical connections.

If an additional load unit is added to the computing system, the additional load unit will have a corresponding additional load resistor 233 connected between the potential load bus 207 and the reference ground potential. Connection of the additional load resistor 233 to the potential load bus 207 will cause the voltage on the potential load bus 207 to decrease. If the voltage on the potential load bus 207 remains above the threshold voltage level of 1 Volt, the additional load unit will be allowed to turn on because the total power output capacity of the power supply units 205-0, 205-1, 205-2 will be sufficient. However, if the voltage on the potential load bus 207 falls below the threshold voltage level of 1 Volt when the additional load unit is connected, the additional load unit will not be allowed to turn on because the total power output capacity of the power supply units 205-0, 205-1, 205-2 will not be sufficient. Once the additional load unit is allowed to turn on, its actual load resistor 239 will be connected between the actual load bus 211 and the reference ground potential. Then, the voltage on the actual load bus 211 will again be the same as the voltage on the potential load bus 207. And, the voltage on the actual load bus 211 will reflect the balance between the actual power consumption of the operating load units and the total power output capacity of the operating power supply units.

It should be appreciated that the actual load bus 211 provides information about the health of the power system 200/200A to the load units 203. For instance, in the example power system 300, a voltage decrease on the actual load bus 211 below the threshold voltage level of 1 Volt signals a reduction in total power output capacity of the power supply units 205 below the total power requirement of the operating load units 203, and thereby signals an imminent loss of power event to the load units 203. The load units 203 may then take action to prevent data corruption and/or may take action to change to a lower operating power state in an attempt to prevent power overload of the power supply units 205 that remain operational.

In some embodiments, load units 203 may have an ability to operate at different power levels by changing their operating power frequency or by activating or deactivating load unit 203 parts. In this type of embodiment, an initial resistance placed on the potential load bus 207 for a given load unit 203 may represent the minimum operating power requirement of the given load unit 203. Then, in order to test whether the power available on the main power bus is adequate to support increasing the given load unit 203 to a higher operating power, additional and/or greater resistances representing the increased power consumption of the given load unit 203 can be connected between the potential load bus 207 and the reference ground potential. If the voltage on the potential load bus 207 remains above the threshold voltage level, e.g., 1 V for the example power system 300, the given load unit 203 is allowed to increase to the higher operating power. However, if the voltage on the potential load bus 207 falls below the threshold voltage level, the given load unit 203 is not allowed to increase to the higher operating power. Once the given load unit 203 has been increased to the higher operating power, a corresponding additional and/or greater resistance is connected between the actual load bus 211 and the reference ground potential such that the potential load bus 207 and the actual load bus 211 have an equivalent electrical connectivity and corresponding equivalent voltage level.

Some computing systems may need to have redundant power capability in order to achieve sufficient availability in the event of an input power failure or power supply unit 205 failure. This redundant power capability may be referred to as N+N or N+1 power redundancy. The power system 200/200A can provide this redundant power capability by preloading the potential load bus 207 with a resistance that corresponds to the additional power supply capacity needed to provide the required redundant power capability. For example, in FIGS. 2A-3, the potential load bus 207 is preloaded by the resistor 233X, where the resistance of the resistor 233X that corresponds to the additional power supply capacity needed to provide the required redundant power capability. In the example power system 300 of FIG. 3, the 1K preload resistor requires an additional 1 kW of redundant power to be present before the load units 203 are allowed to power on. The addition of the 1K preload on the bus requires that the power sources supply an additional 1 mA of current to raise the voltage on bus 207 to 1 Volt. The additional 1 mA of current is equivalent to 1 kW of power source capacity.

In one embodiment, the power system 200/200A will delay the initial supply of power to the main power bus from the power supply units 205 until the total power supply capacity exceeds the total power required by the connected load units 203 plus the redundant power capability represented by the preload resistor 233X. And, if the voltage on the potential load bus 207 is greater than the threshold voltage level, the total power supply capacity of the computing system is sufficient to provide the required redundant power capability. If the voltage on the potential load bus 207 is not greater than the threshold voltage level, the total power supply capacity of the computing system is not sufficient to provide the required redundant power capability, and the load units 203 will not be allowed to turn on.

Figure 4:
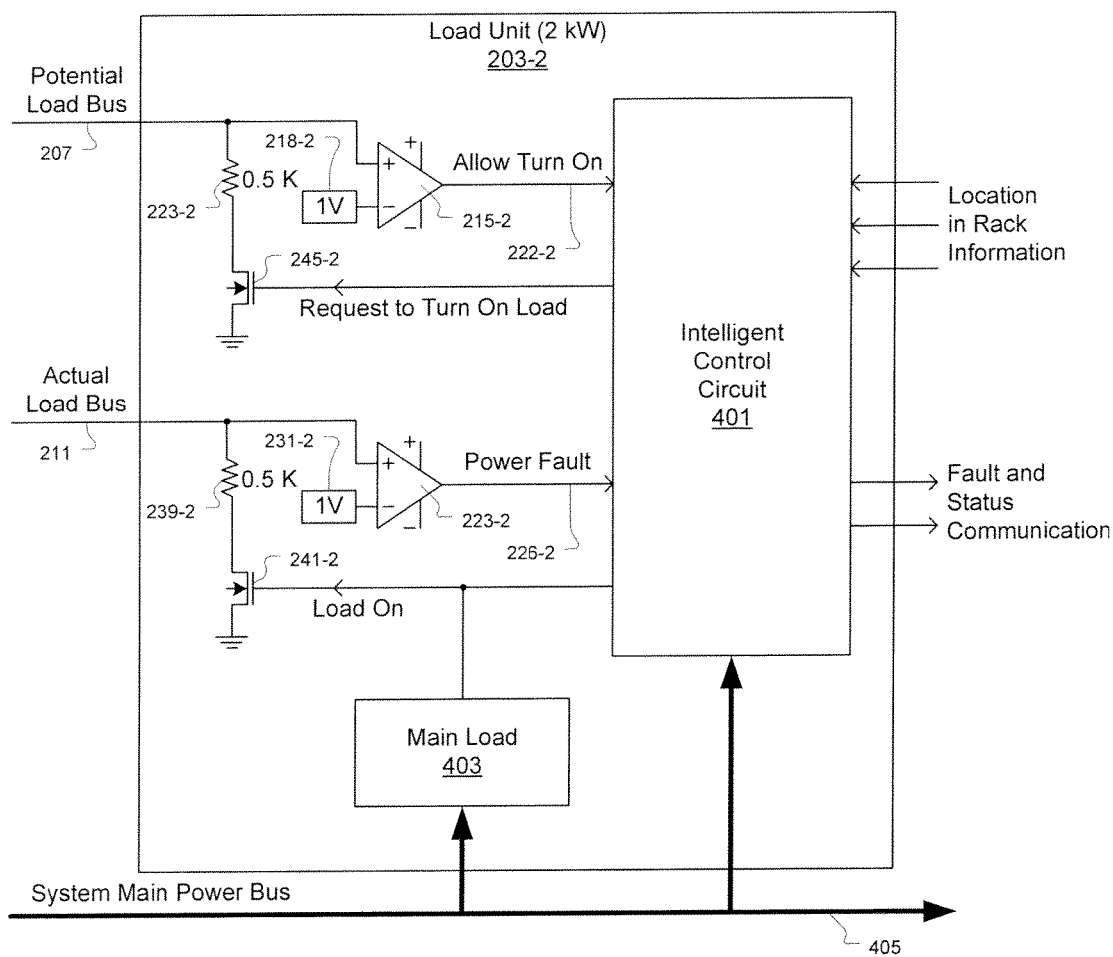
FIG. 4 shows an implementation of the load unit of the example of FIG. 3 in power system of FIG. 2B, in accordance with one embodiment of the present invention.

FIG. 4 shows an implementation of the load unit 203-2 of the example of FIG. 3 in power system 200A of FIG. 2B, in accordance with one embodiment of the present invention. In the power system 200A, the load units 203 can include their own intelligent control circuit. For example, in FIG. 4, the load unit 203-2 includes an intelligent control circuit 401. The intelligent control circuit 401 may be found in load units defined for processing, storage, and/or network switching, among others. The intelligent control circuit 401 can activated at a low input power level in conjunction with issuing a request for permission to power on its load unit 203-2 by operating the controllable connection device 245-2 to connect the load resistor 233-3 between the potential load bus 207 and the reference ground potential. In this embodiment, the power supply units 205 can begin operating and providing output power to the system main power bus 405 as soon as the power supply units 205 receive their input power. Then, as the load units 203 ask for permission to power up through connection of their load resistor 233 between the potential load bus 207 and reference ground potential, the voltage level on the potential load bus 207 will be a function in part of how much power is being supplied to the system main power bus 405 by the operating power supply units 205. If sufficient power is available on the system main power bus 405 based on the voltage present on the potential load bus 207, the load unit 203 will be allowed to power up its main load 403.

It should be understood that the load resistances 233, 239, 233X, 233-0, 233-1, 233-2, 239-0, 239-1, 239-2 described in the embodiments herein can be electrical resistors or essentially any other type of current sink. For example, any one or more of the load resistances 233, 239, 233X, 233-0, 233-1, 233-2, 239-0, 239-1, 239-2 can be replaced by circuitry defined to sink the same current to the reference ground in a manner independent of the voltage level on the bus (207, 211) to which the load resistance is connected.

It may be necessary to manage multiple load units 203 trying to ask for permission to power up their main loads 403 at the same time in order to avoid collisions on the system main power bus 405. For example, in one embodiment, collisions on the system main power bus 405 can be avoided by assigning each load unit 203 a delay time for requesting power up based on the load unit's 203 location in the computing system rack, since load units 203 would normally know where they are located to facilitate servicing. Also, to manage retry requests for power up, each load unit 203 can be assigned a retry waiting period after which the load unit 203 can retry for permission to power up its main load 403. Thus, if the load unit 203 had failed to receive permission to power up its main load 403 on a previous attempt, the load unit 203 can retry for permission to power up after it assigned retry waiting period has elapsed. One feature of the power system 200A is that load units 203 can begin reporting their status and the status of the power system 200A as soon as input power is available to one of the power supply units 205. Then, if additional power supply units 205 do not receive their input power to allow all load units 203 to be made operational, the situation can be reported to service personnel for correction.

Based on the foregoing, it should be appreciated that the power system 200/200A provides the following features, among others, without the cost and complexity associated with a microprocessor-based power controller module:

Initial start or restart of the computing system is accomplished without danger of power supply units 205 overload.

New load units 203 added to an operating computing system will be prohibited from turning on if they have the potential of overloading the power supply units 205 or, as an option, causing the computing system to have less than the desired reserve power capacity.

Additionally, it should be appreciated that the power system 200/200A disclosed herein provides a simple way to quickly inform the load units 203 of a decrease in power supply units 205 capability that might result in power output failure. In conventional power systems, it may be difficult to quickly determine if the loss of a single power supply unit will cause the whole power system to overload, i.e., cause a power fault. However, in the power system 200/200A of the present invention, false power fault alarms can be prevented by using the voltage level on the actual load bus 211 as an indication as to whether or not the remaining power output capacity of the power supply unit(s) 205 is sufficient to satisfy the operating load unit(s) 203 power requirements, and thereby avoid a power fault.

Figure 5A:
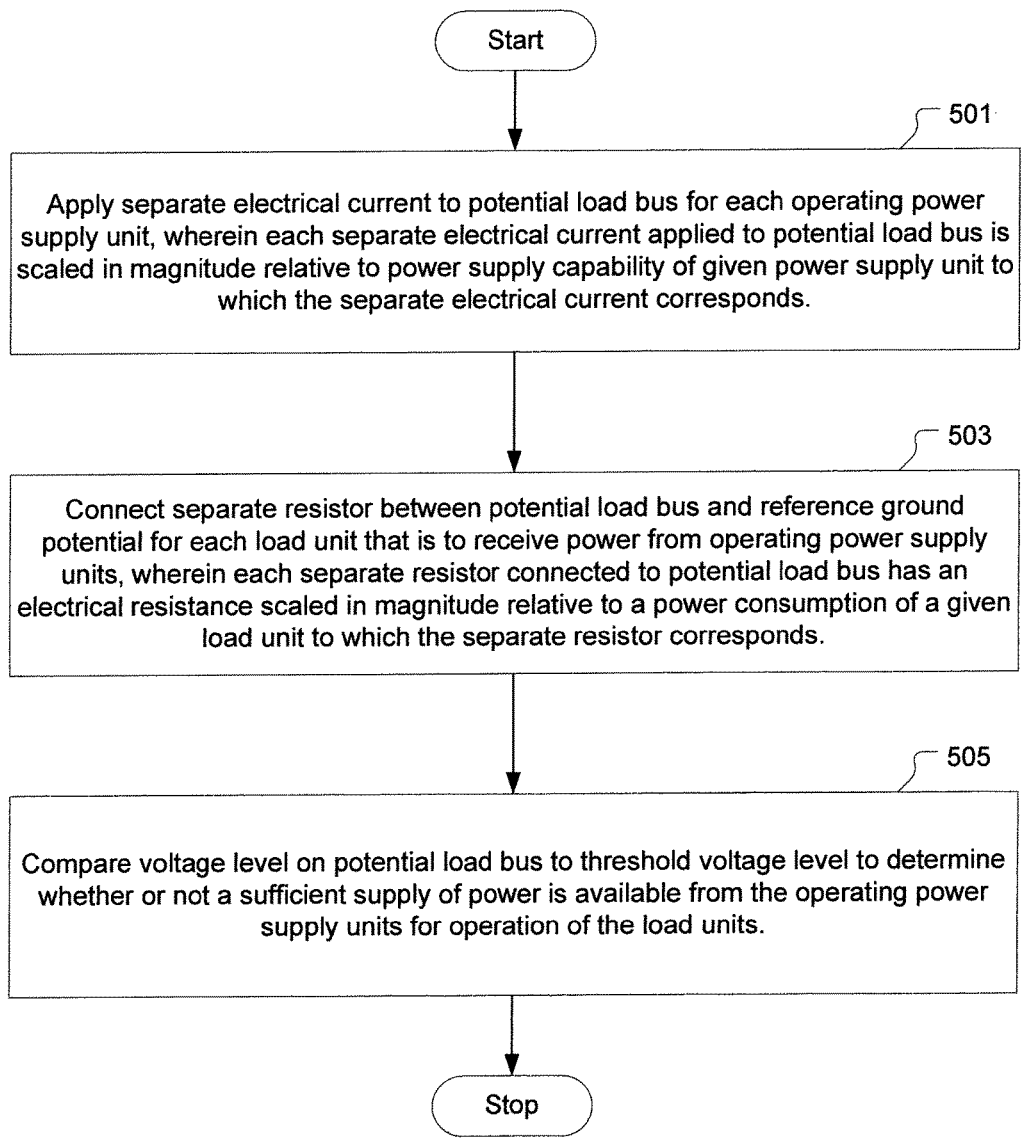
FIG. 5A shows a flowchart of a method for operating a power system, in accordance with one embodiment of the present invention.

FIG. 5A shows a flowchart of a method for operating a power system, in accordance with one embodiment of the present invention. The method includes an operation 501 for applying a separate electrical current to a potential load bus for each of a number of operating power supply units. Each separate electrical current applied to the potential load bus is scaled in magnitude relative to a power supply capability of a given power supply unit to which the separate electrical current corresponds. The method includes an operation 503 for connecting a separate resistor between the potential load bus and a reference ground potential for each of a number of load units that are to receive power from the number of operating power supply units. Each separate resistor connected to the potential load bus has an electrical resistance scaled in magnitude relative to a power consumption of a given load unit to which the separate resistor corresponds. The method includes an operation 505 for comparing a voltage level on the potential load bus to a threshold voltage level to determine whether or not a sufficient supply of power is available from the number of operating power supply units for operation of the number of load units.

The method can also include an operation for setting the threshold voltage level based on each separate electrical current applied to the potential load bus and each separate resistor connected to the potential load bus such that when the supply of power available from the number of operating power supply units exceeds a total power consumption of the number of load units, a voltage level on the potential load bus exceeds the threshold voltage level. And, upon determining that the voltage level on the potential load bus exceeds the threshold voltage level, the method can include an operation for providing power to the number of load units.

In one embodiment, operation 503 is performed such that the separate resistor is connected between the potential load bus and the reference ground potential for the number of load units in a sequential manner. In this embodiment, upon determining that the voltage level on the potential load bus exceeds the threshold voltage level for connection of a given separate resistor to the potential load bus, the method includes providing power to a load unit corresponding to the given separate resistor. In another embodiment, the method includes releasing power from the number of operating power supply units to the number of load units upon verifying that the voltage on the potential load bus exceeds the threshold voltage level after connecting the separate resistor between the potential load bus and the reference ground potential for each of the number of load units.

Figure 5B:
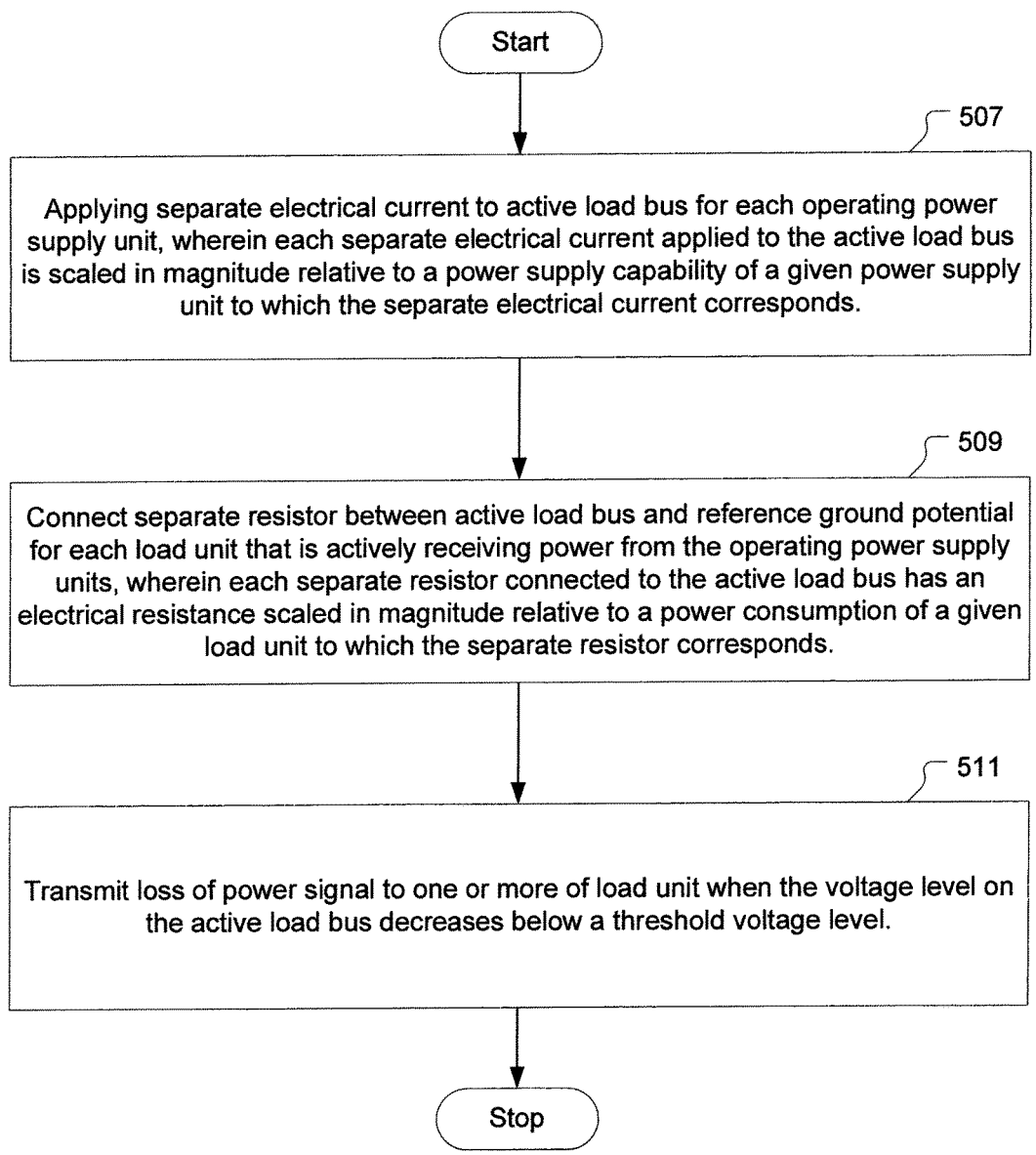
FIG. 5B shows a flowchart of a method for operating a power system, in accordance with one embodiment of the present invention.

FIG. 5B shows a flowchart of a method for operating a power system, in accordance with one embodiment of the present invention. In one embodiment, the method of FIG. 5B is performed in conjunction with the method of FIG. 5A. In another embodiment, the method of FIG. 5B is performed separate from the method of FIG. 5A. The method includes an operation 507 for applying a separate electrical current to an actual load bus for each of a number of operating power supply units. Each separate electrical current applied to the actual load bus is scaled in magnitude relative to a power supply capability of a given power supply unit to which the separate electrical current corresponds. The method also includes an operation 509 for connecting a separate resistor between the actual load bus and the reference ground potential for each of the number of load units that are actively receiving power from the number of operating power supply units. Each separate resistor connected to the actual load bus has an electrical resistance scaled in magnitude relative to a power consumption of a given load unit to which the separate resistor corresponds. The method also includes an operation 511 for transmitting a loss of power signal to one or more of the number of load units when the voltage level on the actual load bus decreases below the threshold voltage level. The method can also include receiving the loss of power signal at one or more of the number of load units, and in response to receiving the loss of power signal, operating the one or more of the number of load units to prepare for an imminent loss of power event.

Figure 6A:
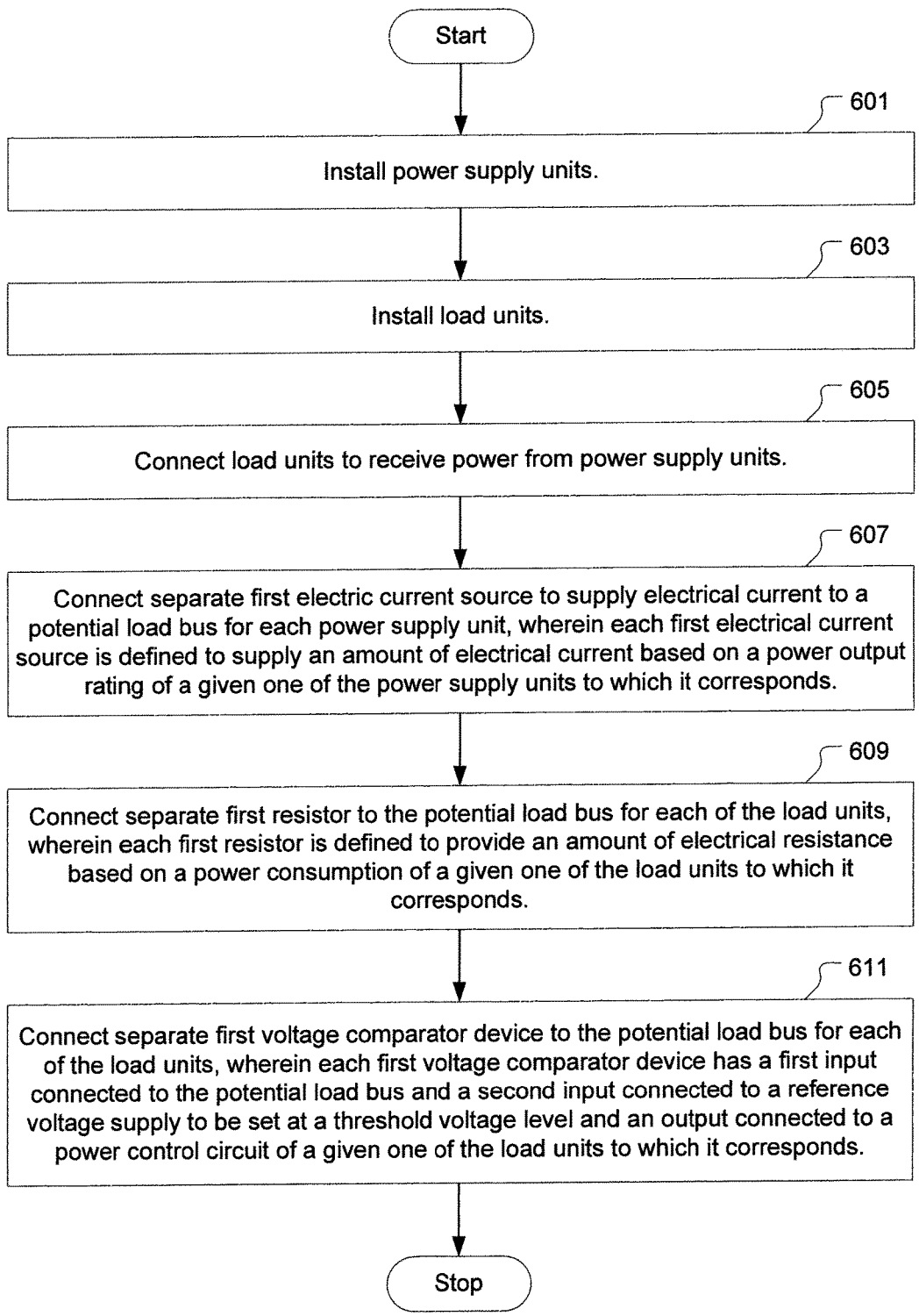
FIG. 6A shows a flowchart of a method for configuring a power system, in accordance with one embodiment of the present invention.

FIG. 6A shows a flowchart of a method for configuring a power system, in accordance with one embodiment of the present invention. The method includes an operation 601 for installing a number of power supply units. The method also includes an operation 603 for installing a number of load units. The method also includes an operation 605 for connecting the number of load units to receive power from the number of power supply units. The method also includes an operation 607 for connecting a separate first electric current source to supply electrical current to a potential load bus for each of the number of power supply units. Each first electrical current source is defined to supply an amount of electrical current based on a power output rating of a given one of the number of power supply units to which it corresponds. The method also includes an operation 609 for connecting a separate first resistor to the potential load bus for each of the number of load units. Each first resistor is defined to provide an amount of electrical resistance based on a power consumption of a given one of the number of load units to which it corresponds. The method also includes an operation 611 for connecting a separate first voltage comparator device to the potential load bus for each of the number of load units. Each first voltage comparator device has a first input connected to the potential load bus and a second input connected to a reference voltage supply to be set at a threshold voltage level and an output connected to a power control circuit of a given one of the number of load units to which it corresponds.

Figure 6B:
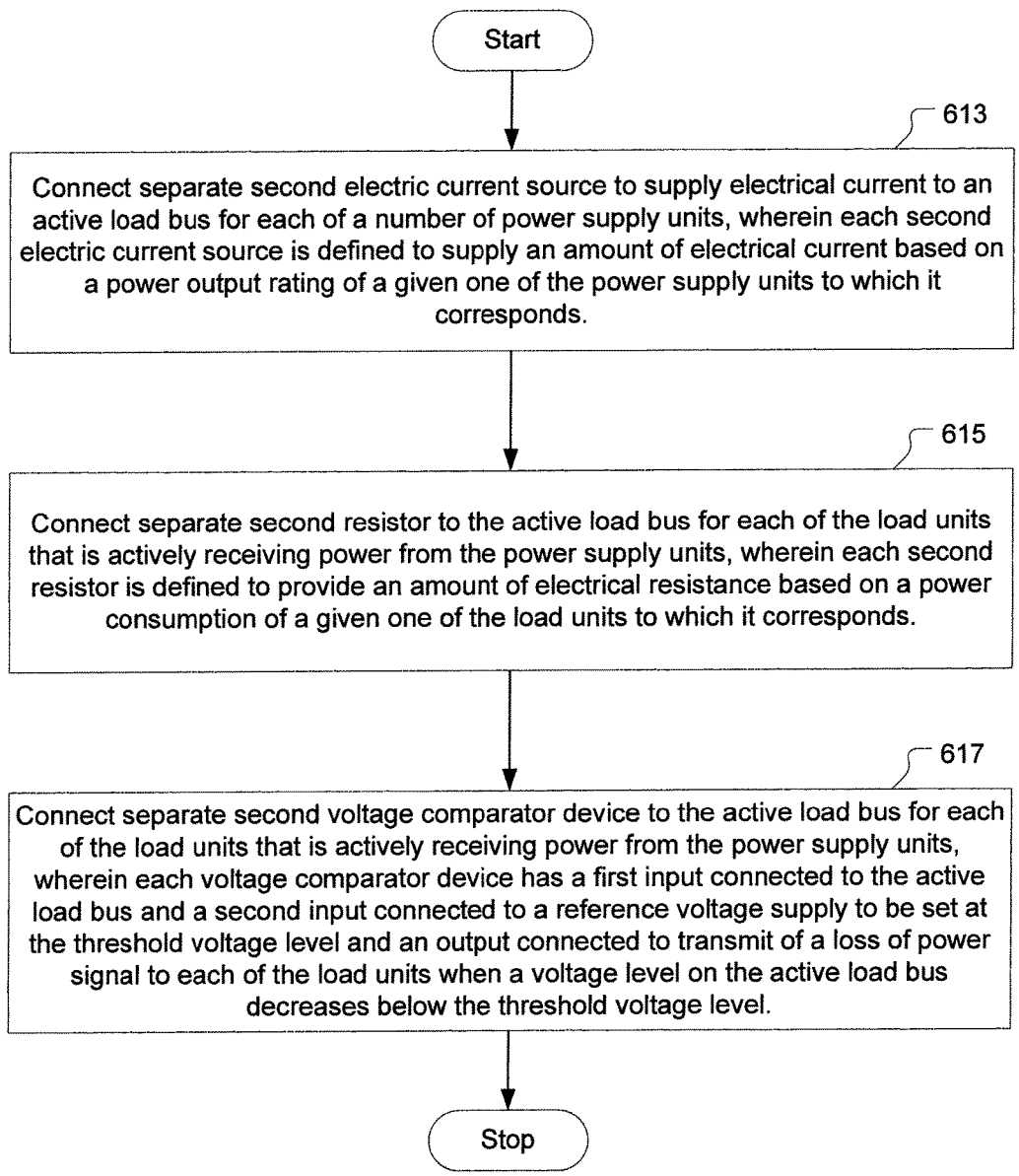
FIG. 6B shows a flowchart of a method for configuring a power system, in accordance with one embodiment of the present invention.

FIG. 6B shows a flowchart of a method for configuring a power system, in accordance with one embodiment of the present invention. In one embodiment, the method of FIG. 6B is performed in conjunction with the method of FIG. 6A. In another embodiment, the method of FIG. 6B is performed separate from the method of FIG. 6A. The method includes an operation 613 for connecting a separate second electric current source to supply electrical current to an actual load bus for each of the number of power supply units. Each second electric current source is defined to supply an amount of electrical current based on a power output rating of a given one of the number of power supply units to which it corresponds. The method also includes an operation 615 for connecting a separate second resistor to the actual load bus for each of the number of load units that is actively receiving power from the number of power supply units. Each second resistor is defined to provide an amount of electrical resistance based on a power consumption of a given one of the number of load units to which it corresponds. The method further includes an operation 617 for connecting a separate second voltage comparator device to the actual load bus for each of the number of load units that is actively receiving power from the number of power supply units. Each voltage comparator device has a first input connected to the actual load bus and a second input connected to a reference voltage supply to be set at the threshold voltage level and an output connected to transmit of a loss of power signal to each of the number of load units when a voltage level on the actual load bus decreases below the threshold voltage level.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Parts of the invention can also be embodied as computer readable code on a computer readable medium. The computer readable medium is any non-transitory data storage device that can store data which can be thereafter be read by a computer system. Examples of the computer readable medium include hard drives, network attached storage (NAS), read-only memory, random-access memory, CD-ROMs, CD-Rs, CD-RWs, DVDs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for operating a power system, comprising:
    applying a separate electrical current to a potential load bus for each of a number of operating power supply units, wherein each separate electrical current applied to the potential load bus is scaled in magnitude relative to a power supply capability of a given power supply unit to which the separate electrical current corresponds;
    connecting a separate resistor between the potential load bus and a reference ground potential for each of a number of load units that are to receive power from the number of operating power supply units, wherein each separate resistor connected to the potential load bus has an electrical resistance scaled in magnitude relative to a power consumption of a given load unit to which the separate resistor corresponds; and
    comparing a voltage level on the potential load bus to a threshold voltage level to determine whether or not a sufficient supply of power is available from the number of operating power supply units for operation of the number of load units.

2. The method for operating a power system as recited in claim 1, further comprising:
    setting the threshold voltage level based on each separate electrical current applied to the potential load bus and each separate resistor connected to the potential load bus, such that when the supply of power available from the number of operating power supply units exceeds a total power consumption of the number of load units, a voltage level on the potential load bus exceeds the threshold voltage level.

3. The method for operating a power system as recited in claim 2, further comprising:
    upon determining that the voltage level on the potential load bus exceeds the threshold voltage level, providing power to the number of load units.

4. The method for operating a power system as recited in claim 2, further comprising:
    connecting a separate controllable connection device between each separate resistor and the reference ground potential, each controllable connection device configured to control electrical connection between the reference ground potential and the separate resistor to which the controllable connection device is connected.

5. The method for operating a power system as recited in claim 4, further comprising:
    operating the separate controllable connection devices to electrically connect the separate resistors between the potential load bus and the reference ground potential for the number of load units in a sequential manner, and wherein upon determining that the voltage level on the potential load bus exceeds the threshold voltage level for connection of a given separate resistor to the potential load bus, providing power to a load unit corresponding to the given separate resistor.

6. The method for operating a power system as recited in claim 2, further comprising:
    releasing power from the number of operating power supply units to the number of load units upon verifying that the voltage on the potential load bus exceeds the threshold voltage level after connecting the separate resistor between the potential load bus and the reference ground potential for each of the number of load units.

7. The method for operating a power system as recited in claim 2, further comprising:
    connecting a separate voltage comparator device to each of the number of load units, each separate voltage comparator device having a first input connected to the potential load bus and a second input connected to a reference voltage supply set at the threshold voltage level and an output connected to a power control circuit of the load unit to which the separate voltage comparator device is connected, each separate voltage comparator device operating to turn on the load unit to which the separate voltage comparator device is connected when the voltage on the potential load bus exceeds the threshold voltage as output by the reference voltage supply.

8. The method for operating a power system as recited in claim 2, further comprising:
    applying a separate electrical current to an actual load bus for each of the number of operating power supply units, wherein each separate electrical current applied to the actual load bus is scaled in magnitude relative to a power supply capability of a given power supply unit to which the separate electrical current corresponds;
    connecting a separate resistor between the actual load bus and the reference ground potential for each of the number of load units that are actively receiving power from the number of operating power supply units, wherein each separate resistor connected to the actual load bus has an electrical resistance scaled in magnitude relative to a power consumption of a given load unit to which the separate resistor corresponds; and
    transmitting a loss of power signal to one or more of the number of load units when the voltage level on the actual load bus decreases below the threshold voltage level.

9. The method for operating a power system as recited in claim 8, further comprising:
    receiving the loss of power signal at one or more of the number of load units, and in response to receiving the loss of power signal, operating the one or more of the number of load units to prepare for an imminent loss of power event.

10. The method for operating a power system as recited in claim 8, wherein the loss of power signal is transmitted instantaneously and continuously to each of the number of load units when the voltage level of the actual load bus is less than the threshold voltage level.

11. The method for operating a power system as recited in claim 8, further comprising:
    connecting a separate voltage comparator device to each of the number of load units, each separate voltage comparator device having a first input connected to the actual load bus and a second input connected to a reference voltage supply set at the threshold voltage level and an output connected to a power control circuit of the load unit to which the separate voltage comparator device is connected, each separate voltage comparator device operating to initiate an ordered shutdown of the load unit to which the separate voltage comparator device is connected when the voltage on the actual load bus falls below the threshold voltage as output by the reference voltage supply.

12. The method for operating a power system as recited in claim 1, further comprising:
connecting at least one additional resistor between the potential load bus and the reference ground potential, wherein the at least one additional resistor does not correspond to one of the number of load units, the at least one additional resistor having an amount of electrical resistance based on a prescribed amount of power supply margin.

13. A method for configuring a power system, comprising:
installing a number of power supply units;
installing a number of load units;
connecting the number of load units to receive power from the number of power supply units;
connecting a separate first electric current source to supply electrical current to a potential load bus for each of the number of power supply units, wherein each first electrical current source is defined to supply an amount of electrical current based on a power output rating of a given one of the number of power supply units to which it corresponds;
connecting a separate first resistor to the potential load bus for each of the number of load units, wherein each first resistor is connected between the potential load bus and a reference ground potential, wherein each first resistor is defined to provide an amount of electrical resistance based on a power consumption of a given one of the number of load units to which it corresponds; and
connecting a separate first voltage comparator device to the potential load bus for each of the number of load units, wherein each first voltage comparator device has a first input connected to the potential load bus and a second input connected to a reference voltage supply to be set at a threshold voltage level and an output connected to a power control circuit of a given one of the number of load units to which it corresponds.

14. The method for configuring the power system as recited in claim 13, wherein the threshold voltage level is set based on each separate first electric current applied to the potential load bus and each separate first resistor connected to the potential load bus, such that when the supply of power available from operating ones of the number of power supply units exceeds a total power consumption of the number of load units, a voltage level on the potential load bus exceeds the threshold voltage level.

15. The method for configuring the power system as recited in claim 14, further comprising:
connecting at least one additional resistor between the potential load bus and the reference ground potential, wherein the at least one additional resistor does not correspond to one of the number of load units, the at least one additional resistor having an amount of electrical resistance based on a prescribed amount of power supply margin.

16. The method for configuring the power system as recited in claim 14, further comprising:
connecting a separate controllable connection device between each separate first resistor and the reference ground potential, each controllable connection device configured to control electrical connection between the reference ground potential and the separate first resistor to which the controllable connection device is connected.

17. The method for configuring a power system as recited in claim 14, further comprising:
connecting a separate second electric current source to supply electrical current to an actual load bus for each of the number of power supply units, wherein each second electric current source is defined to supply an amount of electrical current based on a power output rating of a given one of the number of power supply units to which it corresponds;
connecting a separate second resistor to the actual load bus for each of the number of load units that is actively receiving power from the number of power supply units, wherein each second resistor is defined to provide an amount of electrical resistance based on a power consumption of a given one of the number of load units to which it corresponds, wherein each second resistor is connected between the actual load bus and a reference ground potential; and
connecting a separate second voltage comparator device to the actual load bus for each of the number of load units, wherein each voltage comparator device has a first input connected to the actual load bus and a second input connected to a reference voltage supply to be set at the threshold voltage level and an output connected to transmit of a loss of power signal to each of the number of load units when a voltage level on the actual load bus decreases below the threshold voltage level.

18. The method for configuring a power system as recited in claim 17, further comprising:
connecting a separate transistor between each separate second resistor and the reference ground potential, each separate transistor configured to provide for electrical connection of the separate second resistor to which it is connected to the reference ground potential when the load unit to which the separate transistor corresponds is actively receiving power from the number of power supply units, and each separate transistor configured to provide for electrical isolation of the separate second resistor to which it is connected from the reference ground potential when the load unit to which the separate transistor corresponds is not actively receiving power from the number of power supply units.

19. The method for configuring a power system as recited in claim 17, wherein the separate first electric current source and the separate second electric current source corresponding to a same load unit are configured to output a same amount of electric current.

20. The method for configuring a power system as recited in claim 17, wherein the separate first resistor and the separate second resistor corresponding to a same load unit have the same electrical resistance value.

* * * * *